Patented Dec. 27, 1938

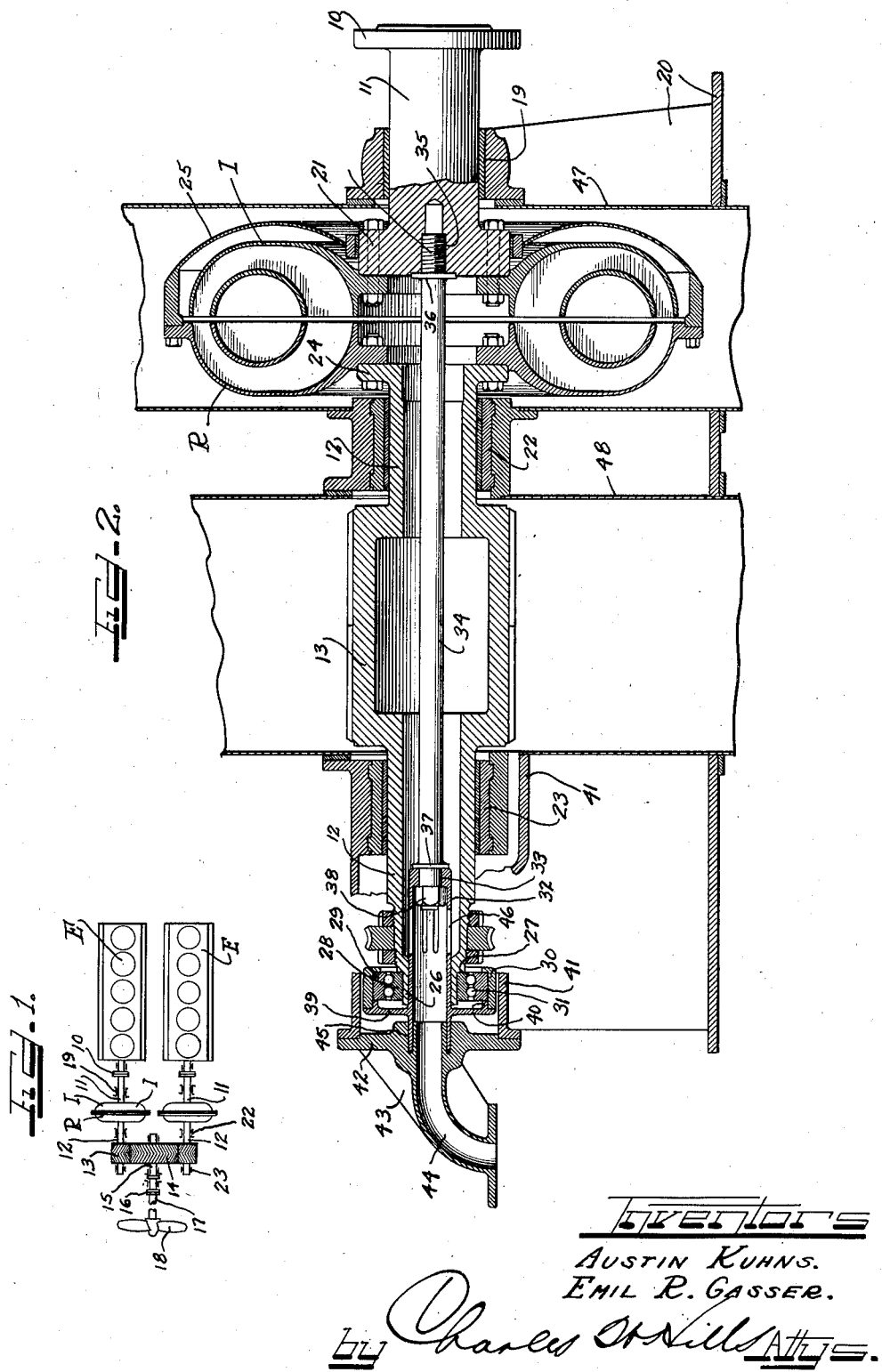

2,141,306

UNITED STATES PATENT OFFICE

2,141,306

POWER TRANSMISSION ASSEMBLY

Austin Kuhns and Emil R. Gasser, Buffalo, N. Y., assignors to Farrel-Birmingham Company, Incorporated, Buffalo, N. Y., a corporation of Connecticut Application June 4, 1937, Serial No. 146,448

5 Claims. (Cl. 60—54)

This invention relates to power transmission assembly adapted particularly for use in driving or propulsion systems in which power units such as Diesel engines are connected through hydraulic clutch mechanisms and gearing elements with an element to be driven, as for example the propeller of marine craft.

In this type of propulsion system more or less complicated and expensive thrust bearings were provided for the shaft of the impeller and runner elements of the hydraulic clutch to hold the elements in proper axial relationship and to prevent axial separation thereof by the pressure of the hydraulic fluid during operation of the system, and the thrust bearing structures were mounted on the supporting base or framework for the driving assembly. An important object of this invention is therefore to provide simplified and less costly structure and arrangement for taking up the axial thrusts of the clutch elements, such thrust means being self-contained or inherent in the clutch structure and its shafting.

In propulsion systems of this type it has been found desirable to utilize gearing of the double helical or herringbone type on account of its more efficient and noiseless operation. In this type of system, as for example a marine propulsion system, the propeller shaft drive gear is journalled in thrust bearing structure which tends to prevent axial shift or oscillation of the propeller shaft but such oscillation may take place, particularly when the propeller has its direction of rotation changed. Where this propeller gear and the driving pinion driven by the engine are of the double helical or herringbone type, any relative axial displacement of the gears while in operation would cause friction between teeth and grinding and wear thereof besides causing considerable noise, and means must therefore be provided to prevent any such relative axial displacement as would disturb the proper and efficient meshing of the gear elements. Another important object of our invention is therefore to provide arrangement which will permit the driving pinion to freely move with the driven gear so that proper mesh is at all times maintained, and this we accomplish by mounting the clutch and driving gear element of each driving unit assembly in bearings in which it may freely shift axially as a unit a sufficient distance for the driving pinion to follow any axial shifting of the propeller shaft and gear, the engine shafts and their coupling connections with the transmission unit assemblies having usually enough freedom of movement to permit such comparatively small axial shifting of the transmission unit assembly as will be sufficient for movement of the drive pinion with any axial shift that the propeller shaft and its gear may be submitted to.

The various features of our invention are incorporated in the structure disclosed on the drawing, in which:

Figure 1 is a more or less diagrammatic plan view showing a propulsion system; and Figure 2 is an enlarged vertical diametral section through one of the transmission assembly units.

Referring to Figure 1 which shows a marine propulsion system, each driving unit comprises an engine E whose shaft is connected by suitable clutch means 10 with the shaft 11 which carries the impeller member I of a hydraulic clutch, the supporting shaft structure 12 for the runner element R of the clutch carrying a drive pinion 13, the drive pinions of the two driving units meshing with a gear 14 on a shaft 15 which is connected by suitable coupling means 16 with the shaft 17 carrying a propeller 18, the gear elements being of the double helical or herringbone type.

Referring to Figure 2, the impeller shaft 11 is journalled in a bearing structure 19 supported on the framework or base structure 20, the shaft terminating at its inner end in a head 21 to which the impeller element I of the clutch is bolted. The runner shaft 12 is journalled at its end in suitable bearing structures 22 and 23 supported by the framework 20, the shaft at its inner end having the flange 24 to which the runner element R of the clutch is bolted. A cover structure 25 is secured at its periphery to the runner element and extends around the impeller element and surrounds the head 21 of the impeller shaft 11, this cover structure serving to retain the hydraulic fluid within the clutch elements.

The runner shaft 12 is hollow or tubular, and intermediate the bearings 22 and 23 the shaft is enlarged to form the drive pinion 13, there being sufficient clearance between the bearings 22, 23, and the ends of the pinion and sufficient clearance between the shaft head 21 and the bearing 19 for axial reciprocation of the shaft structure and the clutch structure as a unit.

The hollow shaft 12 has the outer end portion 26 of reduced diameter to leave a shoulder 27 and to provide a seat for the inner ring 28 of a ball bearing structure whose outer ring 29 seats in a cylindrical retainer cup 30, the bearing balls 31 being interposed between the rings, the inner ring 28 abutting the shoulder 27.

Extending into the outer end of the shaft 12 through the reduced end 26 is a tubular link 32 whose base has the passageway 33 for receiving the outer end of a rod or bar 34 which extends inwardly through the shaft and at its inner end is secured to the impeller shaft 11, axially thereof, by threading into the bore 35 in the shaft, a stop collar or flange 36 being provided on the rod to abut the shaft end after the rod has been securely threaded into the bore.

Near its outer end, the rod has the flange 37 abutting the inner end of the link 32, the end of the rod within the link being threaded to receive a nut 38 between which and the flange 37 the base of the link is securely clamped.

Near its outer end, the tubular link 32 has the radially extending circular web 39 engaging the outer end of the cup 30, the web having the annular flange 40 for engaging in the cup to abut the outer bearing ring 29. The rod 34 is of such length that when the nut 38 is tightened and the link 32 drawn inwardly, the link web 39 will shift the ball bearing structure inwardly, and as this structure abuts the shoulder 27 on the shaft 12, the shaft and the runner element R of the clutch will be shifted inwardly, this adjustment determining the proper gap between the impeller and runner elements, and the ball bearing structure, which is anchored to the shaft 11 through the link 32 and rod 34, taking up the thrust as the impeller and runner elements tend to axially separate under the pressure of the hydraulic fluid when the assembly is in operation. The thrust take-up structure is thus an inherent part of the clutch and shafting structure and is contained within the shafting and the clutch structure. The ball bearings permit easy relative rotation of the impeller and runner elements of the clutch due to the slippage of the runner element.

A housing 41 encloses the ball bearings and the end of the link structure 32, and this housing is closed by a cover 42. The cover supports a bracket 43 through which and the cover extends the passage 44 for the inlet of hydraulic fluid for supplying the clutch structure. The cover has the annular recess 45 surrounding the inner end of the passageway 44 into which recess the outer end of the link 32 extends to form a sealed joint so that the hydraulic fluid charged into the passage 44 cannot escape from the link 32 into and through which the fluid flows and from which it flows to the interior of the shaft 12 through a number of passageways 46 in the link wall, the fluid flowing from the inner end of the shaft 12 into the impeller and runner elements.

Although the propeller shaft 17 is journalled in thrust bearings which tend to prevent axial shift or oscillation of the shaft, there may be more or less axial oscillation, particularly when the direction of rotation of the propeller is changed. Where the gearing is of the herringbone type, provision must be made to permit axial movement of the drive pinion 13 with the gear in order to prevent undue pressure between the gear teeth and grinding or wear thereof and also to prevent noisy operation. With our arrangement in which the shafting for the clutch impeller and runner elements is free for axial shift in the bearing structures 19, 22, and 23, the clutch structure and the shaft structures are movable as a unit axially so that the drive pinions may readily follow any axial shifting of the propeller shaft and gear and so that proper meshing engagement is at all times assured. During such reciprocation of the clutch and shafting structure, the outer end of the link 32 shifts in the recess 45 while still maintaining a sealed joint for preventing escape of hydraulic fluid.

The clutch structure is protected by a casing 47 which serves also as an oil reservoir or sump, and the gearing elements are enclosed within a casing 48, the casings being fixed and suitably supported by the base structure 20.

We thus provide simple yet efficient structure and arrangement for resisting the fluid pressure thrust of the clutch rotary elements and maintaining such elements in proper axial relationship, and simplified means for enabling the drive pinions to readily follow axial movement of the propeller gear. We do not, however, desire to be limited to the exact construction and arrangement shown and described, as changes and modifications may be made without departing from the scope and spirit of the invention.

We claim as follows:

1. In a power transmission assembly of the class described, the combination of a hydraulic clutch structure comprising an impeller element and a runner element axially opposed, a drive shaft for said impeller element, a hollow shaft structure for said runner element, a thrust linkage extending through said hollow shaft structure and anchored at its inner end to said driving shaft, an abutment at the outer end of said linkage, an anti-friction bearing mounted on and surrounding the outer end of said hollow shaft to be engaged by said abutment, said bearing permitting relative rotational movement of said impeller and runner elements and said linkage taking up the axial thrust of the impeller element caused by hydraulic fluid pressure.

2. In a power transmission assembly of the class described, a hydraulic clutch structure comprising an impeller element and a runner element, a drive shaft secured to the impeller element, a hollow supporting shaft for the runner element, a thrust take-up structure comprising a rod extending through said hollow shaft structure and anchored at its inner end to said drive shaft and having a hollow link extending from its outer end to the exterior of said hollow shaft structure, an abutment connection between the outer end of said link and the outer end of said hollow shaft, and a fluid inlet communicating with the outer end of said hollow link whereby hydraulic fluid may flow through said link and hollow shaft to supply said clutch structure, said abutment connection being adapted to permit rotation of said hollow shaft structure relative to said thrust means.

3. In a power transmission assembly of the class described, a hydraulic clutch structure comprising an impeller element and a runner element in axial opposition, a drive shaft for the impeller element, a hollow supporting shaft structure for the runner element, said shaft structures being in axial alignment, a thrust linkage extending through the hollow shaft structure and anchored at its inner end to the driving shaft and having an abutment at its outer end adjacent to the outer end of said hollow shaft, and an anti-friction bearing having its inner race secured to and surrounding the outer end of said hollow shaft and its outer race engaged by said abutment whereby axial separation of the impeller and runner elements caused by hydraulic fluid pressure will be prevented.

4. In a power transmission assembly of the class described, the combination of a hydraulic clutch comprising an impeller element and a runner element axially opposed, a supporting shaft for the impeller element and a supporting shaft for the runner element, one of said shafts being hollow, a linkage extending through said hollow shaft and anchored at its inner end to said other shaft, an abutment at the outer end of said linkage adjacent to the outer end of the hollow shaft, and an anti-friction bearing mounted on and surrounding the outer end of said hollow shaft to be engaged by said abutment, said bearing permitting relative rotational movement of said impeller and runner elements and said linkage taking up the relative axial thrust of said elements caused by the hydraulic fluid pressure.

5. In a power transmission assembly of the class described, the combination of a hydraulic clutch structure comprising an impeller element and a runner element axially opposed, a supporting shaft for the impeller element and a supporting shaft for the runner element, one of said shafts being hollow, a linkage in said hollow shaft with its outer end fitting and extending through the outer end of the hollow shaft and with its inner end anchored to the other shaft, the outer end of said linkage having an abutment adjacent to the outer end of the hollow shaft, an anti-friction bearing between the outer end of the hollow shaft and said abutment for cooperating with said linkage to take up the relative axial thrust of said impeller and runner elements, said hollow shaft communicating with the interior of the clutch structure, a stationary fitting adjacent the outer end of the hollow shaft and having a hydraulic fluid supply passageway therethrough, the outer end of said linkage being hollow and communicating with said supply passageway and having outlet openings for the flow of fluid into the hollow shaft structure and to the hydraulic clutch.

AUSTIN KUHNS.
EMIL R. GASSER.